(12) United States Patent
Shih et al.

(10) Patent No.: US 10,180,320 B2
(45) Date of Patent: Jan. 15, 2019

(54) LOW COST POSITION SENSOR AND MOBILITY DEVICE USING THE SAME

(71) Applicant: Generalplus Technology Inc., Hsinchu (TW)

(72) Inventors: Bing Huang Shih, Hsinchu (TW); Li Sheng Lo, Zhubei (TW)

(73) Assignee: Generalplus Technology Inc., Hsinchu (TW)

( * ) Notice: Subject to any disclaimer, the term of this patent is extended or adjusted under 35 U.S.C. 154(b) by 0 days.

(21) Appl. No.: 15/612,754

(22) Filed: Jun. 2, 2017

(65) Prior Publication Data

US 2017/0350699 A1    Dec. 7, 2017

(30) Foreign Application Priority Data

Jun. 3, 2016 (TW) .............................. 105117510 A

(51) Int. Cl.
| | |
|---|---|
| *G01C 9/10* | (2006.01) |
| *G01B 7/004* | (2006.01) |
| *G05D 1/02* | (2006.01) |
| *G05D 1/08* | (2006.01) |

(52) U.S. Cl.
CPC .............. *G01C 9/10* (2013.01); *G01B 7/004* (2013.01); *G05D 1/02* (2013.01); *G05D 1/0891* (2013.01); *G01C 2009/107* (2013.01)

(58) Field of Classification Search
CPC .... G01C 9/10; G01C 2009/107; G01B 7/004; G05D 1/02; G05D 1/0891
USPC ........................................................ 318/648
See application file for complete search history.

(56) References Cited

U.S. PATENT DOCUMENTS

| | | | | | |
|---|---|---|---|---|---|
| 5,877,686 | A | * | 3/1999 | Ibey | .................... G08B 13/1436 200/61.52 |
| 6,788,292 | B1 | * | 9/2004 | Nako | .................... G06F 1/1616 345/173 |
| 7,450,025 | B2 | * | 11/2008 | Fong | .................... H01H 35/025 200/52 R |
| 2005/0184870 | A1 | * | 8/2005 | Galperin | ............ G08B 13/2462 340/568.2 |
| 2007/0277386 | A1 | * | 12/2007 | Bozzone | .................. G01C 9/06 33/391 |

(Continued)

FOREIGN PATENT DOCUMENTS

| | | | | |
|---|---|---|---|---|
| DE | 10212854 A1 | * | 10/2003 | ............... G01C 9/10 |
| EP | 537812 A2 | * | 4/1993 | |
| JP | 2007115648 A | * | 5/2007 | |

*Primary Examiner* — Kawing Chan
(74) *Attorney, Agent, or Firm* — Muncy, Geissler, Olds & Lowe, P.C.

(57) ABSTRACT

A low cost position sensor and a mobility device using the same are provided. The low cost position sensor comprises a rollable object, a container and a control circuit. The rollable object comprises a specific material. The container has a non-planar inner bottom portion. At least one sensor for detecting coordinates is disposed inside the container. The rollable object is disposed in the container. The sensor can detect the specific material. The control circuit is coupled to the sensor. The sensor detects the specific material to determine a coordinate position of the rollable object, and sends the coordinate position of the rollable object back to the control circuit. The control circuit determines a tilt angle of the container according to the coordinate position of the rollable object.

7 Claims, 3 Drawing Sheets

(56) References Cited

U.S. PATENT DOCUMENTS

| | | | |
|---|---|---|---|
| 2011/0132730 A1* | 6/2011 | Ito | G01C 9/10 200/61.52 |
| 2014/0187681 A1* | 7/2014 | Smith | G01C 9/10 524/21 |
| 2016/0216777 A1* | 7/2016 | Geiger | G01C 9/10 |

* cited by examiner

LOW COST POSITION SENSOR AND MOBILITY DEVICE USING THE SAME

BACKGROUND OF THE INVENTION

This application claims priority of Ser. No. 10/511,7510 filed in Taiwan R.O.C. on Jun. 3, 2016 under 35 USC 119, the entire content of which is hereby incorporated by reference.

Field of the Invention

The present invention relates to the position recognition technology, and more particularly to a low cost position sensor and a mobility device using the same.

Description of the Related Art

Currently market available and frequently seen position sensors include a level sensor, a ball sensor, a triaxial accelerometer and the like, which are widely used in position detection. These position sensors have the high cost, the high calculation loading or the insufficient accuracy. For example, when the position sensor based on the triaxial accelerometer is stationary, the triaxial accelerometer cannot easily obtain the accurate position. The ball sensor has the limited accuracy, and is only typically used to detect whether the tilt is present, but cannot determine the tilt degree. Furthermore, the level sensor has the complicated structure.

Thus, a position sensor having the simple structure and the detection accuracy is needed.

SUMMARY OF THE INVENTION

An object of the present invention is to provide a low cost position sensor, which is capable of detecting a position with the lower cost and the higher accuracy and has the simple structure, and a mobility device using the same.

In view of this, the present invention provides a low cost position sensor. The low cost position sensor comprises a rollable object, a container and a control circuit. The rollable object comprises a specific material. The container has a non-planar inner bottom portion, wherein at least one sensor for detecting coordinates is disposed inside the container, the rollable object is disposed in the container, and the sensor can detect the specific material. The control circuit is coupled to the sensor, wherein the sensor detects the specific material to determine a coordinate position of the rollable object, and sends the coordinate position of the rollable object back to the control circuit. The control circuit determines a tilt angle of the container according to the coordinate position of the rollable object.

The present invention further provides a mobility device. The mobility device comprises at least one motor, a low cost position sensor and a control circuit. The low cost position sensor comprises a rollable object and a container. The rollable object comprises a specific material. The container has a non-planar inner bottom portion, wherein at least one sensor for detecting coordinates is disposed inside the container, the rollable object is disposed in the container, and the sensor can detect the specific material. The control circuit is coupled to the motor and the sensor, wherein the sensor detects the specific material to determine a coordinate position of the rollable object, and sends the coordinate position of the rollable object back to the control circuit. The control circuit determines a tilt angle of the container according to the coordinate position of the rollable object, and the control circuit controls the motor according to the tilt angle of the container.

In the low cost position sensor and the mobility device using the same according to the preferred embodiment of the present invention, the rollable object is an elliptic sphere, and the inner bottom portion of the container has a bowl shape. In another preferred embodiment, the rollable object is an elliptic sphere, and the inner bottom portion of the container has a hemispherical shape.

In the low cost position sensor and the mobility device using the same according to the preferred embodiment of the present invention, the sensor comprises a first electroconductive strip and a second electroconductive strip. The first electroconductive strip is disposed annularly from a top portion of the container to the inner bottom portion of the container. The first electroconductive strip has a resistive property. A first end of the first electroconductive strip is coupled to a power voltage, and a second end of the first electroconductive strip is coupled to a common voltage. The second electroconductive strip is disposed annularly from the top portion of the container to the inner bottom portion of the container. The second electroconductive strip is parallel to and does not intersect with the first electroconductive strip. In addition, in the preferred embodiment, the control circuit comprises an analog-to-digital converter. The analog-to-digital converter comprises an input terminal and an output terminal. The input terminal of the analog-to-digital converter is coupled to the second electroconductive strip. Furthermore, in the preferred embodiment, the rollable object is made of an electroconductive material. When the rollable object contacts the first electroconductive strip and the second electroconductive strip, the output terminal of the analog-to-digital converter outputs a corresponding digital signal according to the first electroconductive strip through voltage dividing of the rollable object to determine the coordinate position of the rollable object inside the container.

In the low cost position sensor and the mobility device using the same according to the preferred embodiment of the present invention, the sensor comprises a surface capacitive sensor. The surface capacitive sensor is disposed inside the container and coupled to the control circuit. In addition, in this preferred embodiment, the rollable object is made of a spherical electroconductive material. The surface capacitive sensor sends coordinates of the spherical electroconductive material back to the control circuit according to a capacitive change. The control circuit determines the coordinate position of the rollable object inside the container according to the sent coordinates In summary, the essence of the present invention is to provide a container, a sensor disposed in the container, and an object, which is disposed in the container and is made of a material that can be sensed by the sensor. When the container is tilted, the object can move in the container. At this time, the coordinates of the above-mentioned object are acquired by the sensor inside the container, so that the tilt angle of the whole device can be obtained.

The above and other objectives, characteristic and advantages of the invention will become better understood with regard to the following detailed description of the preferred but non-limiting embodiments. The following description is made with reference to the accompanying drawings.

DETAILED DESCRIPTION OF THE INVENTION

Figure 1:
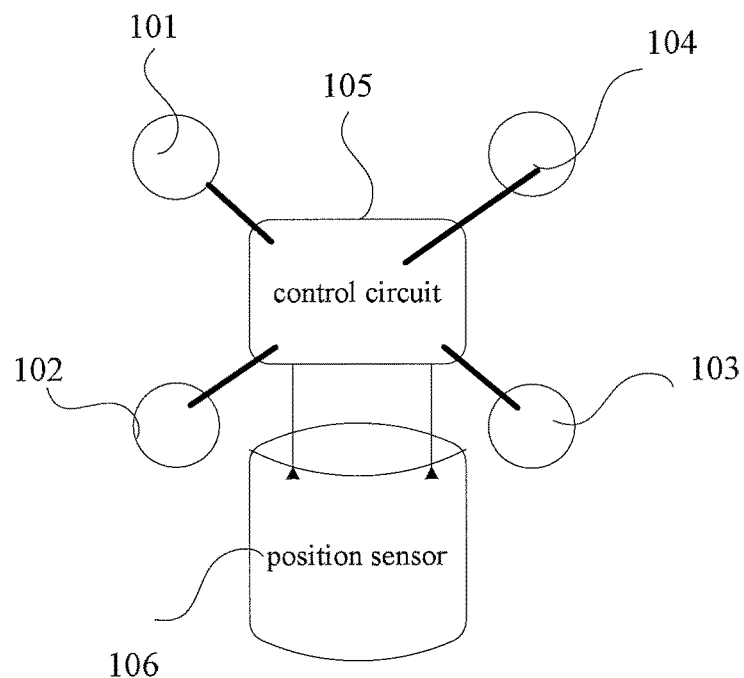
FIG. 1 is a schematic view showing a mobility device according to a preferred embodiment of the present invention.
Figure 2:
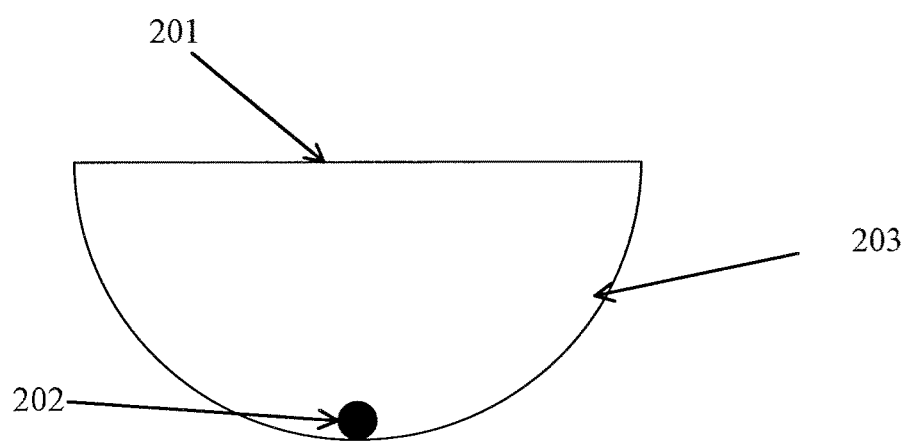
FIG. 2 is a schematic view showing a low cost position sensor according to a preferred embodiment of the present invention.

FIG. 1 is a schematic view showing a mobility device according to a preferred embodiment of the present invention. Referring to FIG. 1, the mobility device comprises four motors 101 to 104, a control circuit 105 and a position sensor 106 according to the preferred embodiment of the present invention. FIG. 2 is a schematic view showing a low cost position sensor according to a preferred embodiment of the present invention. Referring to FIG. 2, the position sensor 106 in this embodiment comprises a container 201 and a rollable object 202. The container 201 has a non-planar inner bottom portion, wherein the inner bottom portion having a bowl shape is illustrated in this embodiment. At least one sensor 203 for detecting coordinates is disposed inside the container 201. The rollable object 202 is disposed in the container 201. In this embodiment, the rollable object 202 comprises a specific material, and the sensor 203 for detecting coordinates can detect the specific material. The sensor 203 for detecting coordinates is coupled to the control circuit 105, and sends the detected coordinates of the rollable object 202 back to the control circuit 105.

Figure 3A:
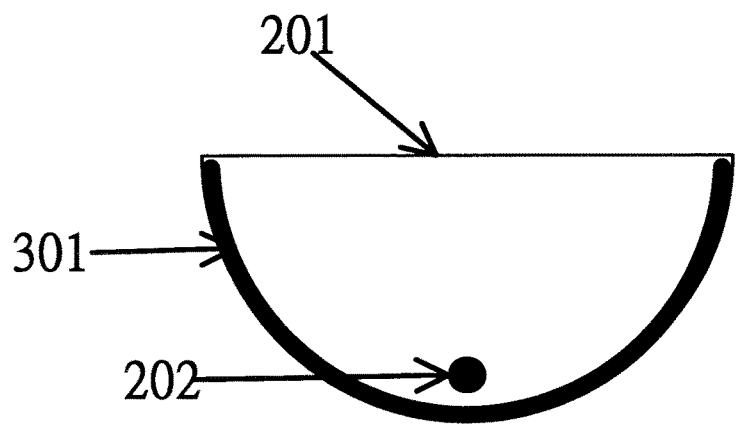
FIG. 3A is a schematic structure view showing a sensor 203 for detecting coordinates of the low cost position sensor according to a preferred embodiment of the present invention.
Figure 3B:
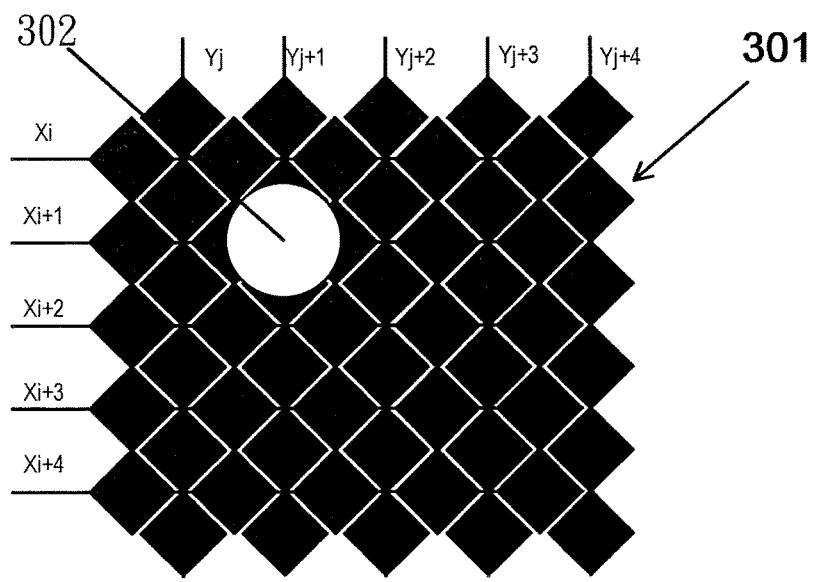
FIG. 3B is a schematic structure view showing a sensor 203 for detecting coordinates of the low cost position sensor according to a preferred embodiment of the present invention.

FIG. 3A is a schematic structure view showing a sensor 203 for detecting coordinates of the low cost position sensor according to a preferred embodiment of the present invention. As shown in FIG. 3A, the sensor 203 for detecting coordinates in this embodiment is implemented by a capacitive sensor 301, and is disposed on the inner bottom portion of the container 201. FIG. 3B is a schematic structure view showing a sensor 203 for detecting coordinates of the low cost position sensor according to a preferred embodiment of the present invention. Referring to FIG. 3B, the capacitive sensor 301 comprises multiple X coordinate sensors $Xi$, $Xi+1$, $Xi+2$, $Xi+3$ and $Xi+4$, and multiple Y coordinate sensors $Yj$, $Yj+1$, $Yj+2$, $Yj+3$ and $Yj+4$. In addition, the rollable object 202 is a metallic ball 302, for example. Each of the X coordinate sensors $Xi$, $Xi+1$, $Xi+2$, $Xi+3$ and $Xi+4$ and each of the Y coordinate sensors $Yj$, $Yj+1$, $Yj+2$, $Yj+3$ and $Yj+4$ are coupled to the control circuit 105. The control circuit 105 performs the capacitive detection. Because the capacitive detection belongs to the prior art, detailed descriptions thereof will be omitted.

It is assumed that when the container 201 is not tilted, the position of the metallic ball 302 is at the intersection of the X coordinate sensor $Xi+2$ and the Y coordinate sensor $Yj+2$. The control circuit 105 determines that the position of the metallic ball 302 is at the intersection of the X coordinate sensor $Xi+1$ and the Y coordinate sensor $Yj+1$ at this time by performing the capacitive detection. The control circuit 105 can determine the tilt direction and the tilt angle of the container 201 according to the position of the metallic ball 302. Thus, the position sensing effect can be achieved.

Figure 4A:
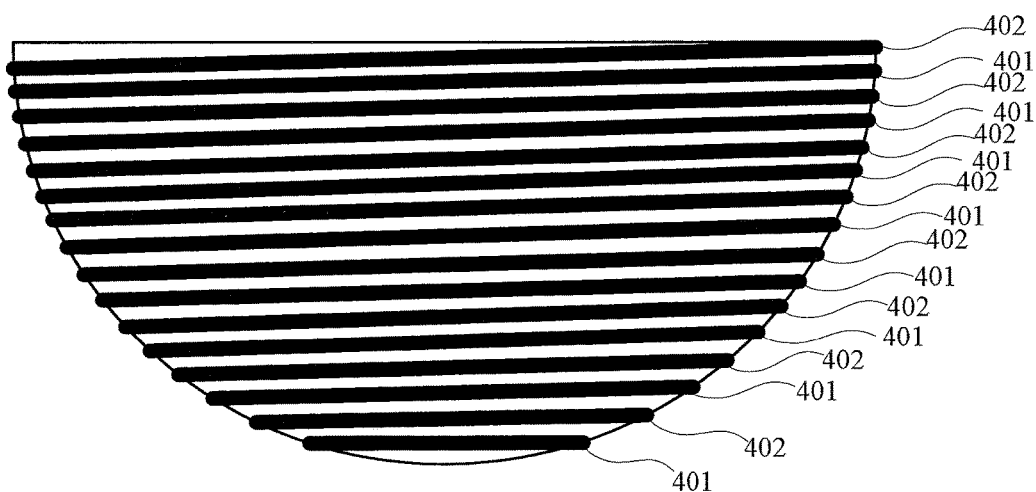
FIG. 4A is a schematic structure view showing a sensor 203 for detecting coordinates of the low cost position sensor according to another preferred embodiment of the present invention.

FIG. 4A is a schematic structure view showing a sensor 203 for detecting coordinates of the low cost position sensor according to another preferred embodiment of the present invention. As shown in FIG. 4A, a first electroconductive strip 401 and a second electroconductive strip 402 are disposed inside the container 201 in this embodiment. The first electroconductive strip 401 and the second electroconductive strip 402 do not intersect each other. In addition, the first electroconductive strip 401 and the second electroconductive strip 402 are disposed annularly from the top portion of the container to the inner bottom portion of the container.

Figure 4B:
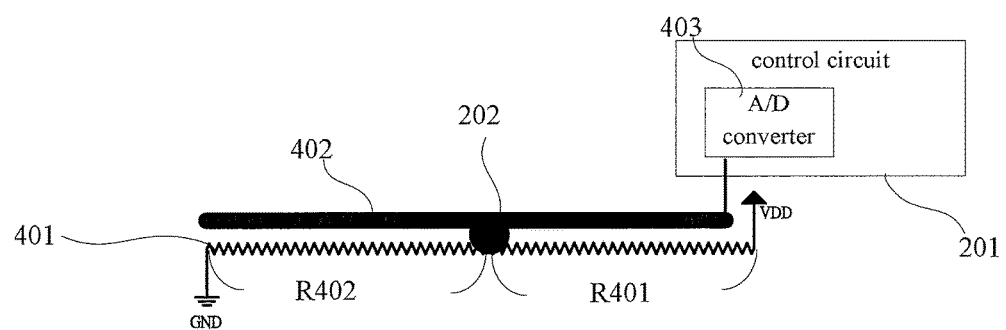
FIG. 4B is a circuit block diagram showing a sensor 203 for detecting coordinates of the low cost position sensor according to another preferred embodiment of the present invention.

FIG. 4B is a circuit block diagram showing a sensor 203 for detecting coordinates of the low cost position sensor according to another preferred embodiment of the present invention. As shown in FIG. 4B, the first electroconductive strip 401 is a resistive wire, a first end of the first electroconductive strip 401 is coupled to a power voltage VDD, and a second end of the first electroconductive strip 401 is coupled to a common voltage GND. The second electroconductive strip 402 is coupled to an input terminal of an analog-to-digital converter 403 inside the control circuit 105. When the rollable object 202 contacts the first electroconductive strip 401 and the second electroconductive strip 402 concurrently, the second electroconductive strip 402 receives the resistor-divided voltage (VDD×R401÷(R401+R402)) constituted by the resistor R401 and the resistor R402. The analog-to-digital converter 403 converts the resistor-divided voltage (VDD×R401÷(R401+R402)) into the digital value. The control circuit can determine the coordinate position of the rollable object 202 according to the digital value, and can thus determine the tilt direction and the tilt angle of the container 201.

In addition, the surface composition material of the rollable object 202 in this embodiment is an electroconductive material, and may be typically a metal material. In addition, the rollable object 202 needs not to have the spherical shape, and may have an elliptic shape or a deformable shape. The main reason is that the rollable object 202 must contact the first electroconductive strip 401 and the second electroconductive strip 402 in the container 201 concurrently. Furthermore, although the illustrated container 201 in the embodiment of FIG. 1 has the bowl shape, the inside of the container 201 may also be polygonal. As long as the special is made, even the spherical rollable object 202 can contact the first electroconductive strip 401 and the second electroconductive strip 402 concurrently. So, the present invention does not intend to restrict the container to have the bowl shape.

Similarly, the best shape of the metallic ball 302 used in the embodiment of FIGS. 3A and 3B is not regular spherical, but is similar to an ellipse, so that the contact between the metallic ball 302 and the container 201 is not only the one point-like portion having a very small area. In addition, a flexible electroconductive sphere is preferred so that the contact portion between the flexible electroconductive sphere and the inner surface of the container 201 has the larger surface contact area, and the capacitive sensing value also can be relatively increased to prevent the mis-judgement.

Furthermore, although a four-rotor unmanned aerial vehicle is described as an example in the embodiment of FIG. 1, those skilled in the art should know that the low cost position sensor of the present invention can be applied to a four-rotor unmanned aerial vehicle, and may also be applied to a balance vehicle, such as an electric personal assistive mobility device (EPAMD). When being applied to the EPAMD, it can assist the device enter the dynamic stabilization state to assist the automatic balance ability of the EPAMD itself.

In summary, the essence of the present invention is to provide a container, a sensor disposed in the container, and an object, which is disposed in the container and is made of a material that can be sensed by the sensor. When the container is tilted, the object can move in the container. At this time, the coordinates of the above-mentioned object are acquired by the sensor inside the container, so that the tilt angle of the whole device can be obtained.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A low cost position sensor, comprising:
   a rollable object comprising a specific material;
   a container having a non-planar inner bottom portion, wherein at least one sensor for detecting coordinates is disposed inside the container, the rollable object is disposed in the container, and the sensor detects the specific material; and a control circuit coupled to the sensor, wherein the sensor detects the specific material to determine a coordinate position of the rollable object, and sends the coordinate position of the rollable object back to the control circuit, wherein the control circuit determines a tilt angle of the container according to the coordinate position of the rollable object;
   wherein the sensor comprises:
      a first electroconductive strip disposed annularly from a top portion of the container to the inner bottom portion of the container, wherein the first electroconductive strip has a resistive property, wherein a first end of the first electroconductive strip is coupled to a power voltage, and a second end of the first electroconductive strip is coupled to a common voltage; and
      a second electroconductive strip disposed annularly from the top portion of the container to the inner bottom portion of the container, wherein the second electroconductive strip is parallel to and does not intersect with the first electroconductive strip,
   wherein the control circuit comprises:
      an analog-to-digital converter comprising an input terminal and an output terminal, wherein the input terminal of the analog-to-digital converter is coupled to the second electroconductive strip,
   wherein the rollable object is made of an electroconductive material,
   wherein when the rollable object contacts the first electroconductive strip and the second electroconductive strip, the output terminal of the analog-to-digital converter outputs a corresponding digital signal according to the first electroconductive strip through voltage dividing of the rollable object to determine the coordinate position of the rollable object inside the container.

2. The low cost position sensor according to claim 1, wherein the rollable object is an elliptic sphere, and the inner bottom portion of the container has a polygonal inner surface.

3. The low cost position sensor according to claim 1, wherein the rollable object is a circular sphere, and the inner bottom portion of the container has a hemispherical inner surface.

4. A mobility device, comprising:
   at least one motor;
   a low cost position sensor, comprising:
      a rollable object comprising a specific material; and
      a container having a non-planar inner bottom portion, wherein at least one sensor for detecting coordinates is disposed inside the container, the rollable object is disposed in the container, and the sensor detects the specific material; and
      a control circuit coupled to the motor and the sensor, wherein the sensor detects the specific material to determine a coordinate position of the rollable object, and sends the coordinate position of the rollable object back to the control circuit,
   wherein the control circuit determines a tilt angle of the container according to the coordinate position of the rollable object,
   wherein the control circuit controls the motor according to the tilt angle of the container;
   wherein the sensor comprises:
      a first electroconductive strip disposed annularly from a top portion of the container to the inner bottom portion of the container, wherein the first electroconductive strip has a resistive property, wherein a first end of the first electroconductive strip is coupled to a power voltage, and a second end of the first electroconductive strip is coupled to a common voltage; and
      a second electroconductive strip disposed annularly from the top portion of the container to the inner bottom portion of the container, wherein the second electroconductive strip is parallel to and does not intersect with the first electroconductive strip,
   wherein the control circuit comprises an analog-to-digital converter comprising an input terminal and an output terminal, wherein the input terminal of the analog-to-digital converter is coupled to the second electroconductive strip,
   wherein the rollable object is made of an electroconductive material,
   wherein when the rollable object contacts the first electroconductive strip and the second electroconductive strip, the output terminal of the analog-to-digital converter outputs a corresponding digital signal according to the first electroconductive strip through voltage dividing of the rollable object to determine the coordinate position of the rollable object inside the container.

5. The mobility device according to claim 4, wherein the rollable object is an elliptic sphere, and the inner bottom portion of the container has a bowl shape.

6. The mobility device according to claim 4, wherein the rollable object is an elliptic sphere, and the inner bottom portion of the container has a hemispherical shape.

7. The mobility device according to claim 4, wherein the mobility device is a four-rotor rotorcraft, and the mobility device has four motors each coupled to the control circuit.

* * * * *